United States Patent
Zeng et al.

(10) Patent No.: US 7,499,182 B2
(45) Date of Patent: Mar. 3, 2009

(54) OPTICAL SIGNAL MEASUREMENT SYSTEM

(75) Inventors: Ke-Cai Zeng, Fremont, CA (US); Paul Chang, Fremont, CA (US); Jürgen Brendel, Nyon (CH)

(73) Assignee: Sunrise Telecom Incorporated, San Jose, CA (US)

( * ) Notice: Subject to any disclaimer, the term of this patent is extended or adjusted under 35 U.S.C. 154(b) by 28 days.

(21) Appl. No.: 11/615,986

(22) Filed: Dec. 24, 2006

(65) Prior Publication Data

US 2007/0159638 A1 Jul. 12, 2007

Related U.S. Application Data

(60) Provisional application No. 60/757,961, filed on Jan. 10, 2006.

(51) Int. Cl.
*G01B 9/02* (2006.01)
(52) U.S. Cl. ...................................... 356/519
(58) Field of Classification Search .............. 356/519, 356/454, 450, 73.1
See application file for complete search history.

(56) References Cited

U.S. PATENT DOCUMENTS

| | | | |
|---|---|---|---|
| 6,327,036 B1 | 12/2001 | Bao et al. | |
| 6,614,513 B2 | 9/2003 | Hoyer | |
| 6,614,527 B2 | 9/2003 | Fuhrmann et al. | |
| 6,690,468 B1 | 2/2004 | Benzel et al. | |
| 6,795,607 B1 | 9/2004 | Archambault et al. | |
| 6,842,464 B2 | 1/2005 | Funakawa et al. | |
| 7,019,832 B2 | 3/2006 | Fuhrmann et al. | |
| 2002/0126348 A1 | 9/2002 | Lange et al. | |
| 2002/0131104 A1 | 9/2002 | Johnson et al. | |
| 2004/0208293 A1 | 10/2004 | Mohammadian et al. | |
| 2005/0030522 A1* | 2/2005 | Baney et al. | 356/72 |
| 2005/0271386 A1 | 12/2005 | Zeng et al. | |

FOREIGN PATENT DOCUMENTS

| | | |
|---|---|---|
| EP | 1081473 | 3/2001 |
| EP | 1130422 | 9/2001 |
| EP | 1150144 | 10/2001 |
| EP | 1236981 | 9/2002 |

OTHER PUBLICATIONS

Huttner and Brendel, "Photon-counting techniques for fiber measurements," Lightwave, Aug. 2000, pp. 1-4.

* cited by examiner

*Primary Examiner*—Tarifur Chowdhury
*Assistant Examiner*—Jonathon D Cook
(74) *Attorney, Agent, or Firm*—Mikio Ishimaru

(57) ABSTRACT

An optical signal measurement system provides a tunable optical filter. An unknown optical signal is scanned through the tunable optical filter. The wavelength and chromatic dispersion values of the unknown optical signal scanned through the tunable optical filter are measured by operating the tunable optical filter in a scanning mode for at least one of OSA and PMD measurements, and in a stepping mode for CD measurements. The wavelength and the dispersion values in the unknown optical signal are specified.

24 Claims, 9 Drawing Sheets

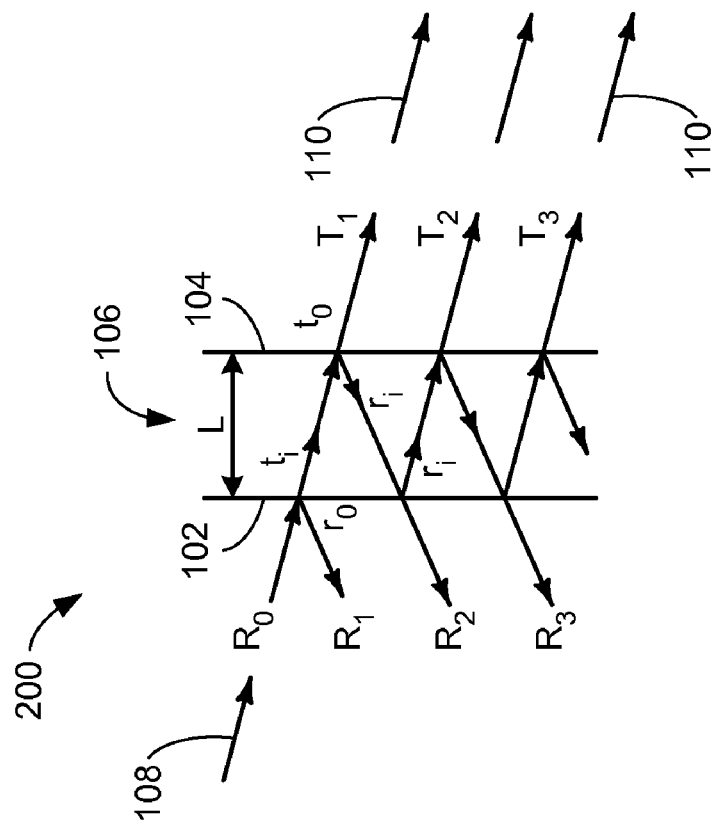
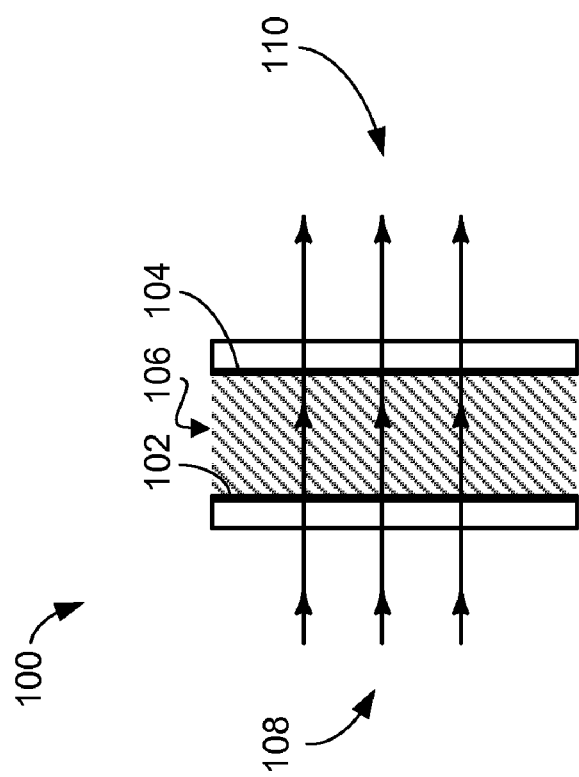

OPTICAL SIGNAL MEASUREMENT SYSTEM

CROSS-REFERENCE TO RELATED APPLICATIONS

This application claims the benefit of U.S. Provisional Patent Application Ser. No. 60/757,961, filed Jan. 10, 2006.

The present application contains subject matter related to a co-pending U.S. Patent Application by Paul Chang and Ke-Cai Zeng, Ser. No. 11/048,455, filed Jan. 31, 2005, and entitled "FULL-BAND OPTICAL SPECTRUM ANALYZER AND METHOD". The related application is assigned to Sunrise Telecom Incorporated.

The present application also contains subject matter related to a concurrently filed U.S. Patent Application by Ke-Cai Zeng entitled "WAVELENGTH MEASUREMENT OR MONITORING SYSTEM FOR BROAD- AND INTER-BAND MULTI-WAVELENGTH REFERENCES". The related application is assigned to Sunrise Telecom Incorporated.

TECHNICAL FIELD

The present invention relates generally to optical spectrum and dispersion analysis, and more particularly to broad wavelength range optical spectrum polarization mode and chromatic dispersion analyzers utilizing Fabry-Perot filters.

BACKGROUND ART

The fiber optics telecommunications ("telecom") field includes such technologies as fiber optical cables and fiber optical networks. Fiber optical networks carry a great variety of everyday information signals, such as conversations, data communications (e.g., fax messages), computer-to-computer data transfers, cable television, the Internet, and so forth. Such information signals are transported between cities as well as from place to place within cities. Due to rapidly increasing communications traffic, the increased capacity of fiber optical cables is more and more necessary, compared to the lower capacities of older metallic wire cables.

An optical fiber cable is typically composed of a bundle of individual optical fibers. One single optical fiber can carry thousands of data and communication signals on a single wavelength of light. That same single optical fiber can also carry multiple wavelengths of light, thus enabling it to carry many, many multiple optical signals at the same time. Each wavelength alone can carry data that transfers at a rate over 10 Gbit/s.

To lay out such optical networks and maintain their communications, it is necessary to perform a variety of sensitive analyses, such as measuring both the chromatic and polarization dispersion, monitoring the optical power, wavelength, and the optical signal-to-noise ratio of the optical signals at each of the wavelengths traveling through the optical fiber, and so forth. Traditionally, such analyses are carried out by several analytical tools including chromatic dispersion ("CD"), polarization mode dispersion ("PMD"), and optical spectrum analyzers ("OSA").

Chromatic dispersion means that light with different wavelengths travels though the media with different speeds. An optical pulse, which consists of different wavelength components, will be broadened as it travels through the optical fiber due to CD. There are several ways to measure CD. One type of CD performs chromatic dispersion analysis based on measuring the relative time delay between optical signals with different wavelengths.

Polarization mode dispersion means that light with different polarization modes travels through the media with different speeds. An optical pulse, which consists of different polarization modes, will be broadened as it travels through the optical fiber due to PMD. There are several ways to measure PMD. One of the methods is called "Fixed Analyzer method". Using this method, both the full optical power distribution and that of a particular polarization mode distribution of the optical signal are measured and compared, and PMD is derived from counting the peaks of the ratio of the optical power spectrum.

An OSA performs optical spectrum analysis (also referred to as "OSA"), which, as indicated, is the measurement of optical power as a function of wavelength. OSA applications include testing laser and/or light-emitting diode ("LED") light sources for spectral purity and power distribution, monitoring an optical transmission system of a wavelength division multiplexing ("WDM") system for signal quality and noise figures, testing transmission characteristics of various optical devices and components, and so forth.

OSA is typically performed by passing an optical signal to be analyzed through a tunable optical filter. "Tunable" means that the filter can be adjusted to resolve or pick out the individual components (wavelengths) of the optical signal.

Three basic types of filters are widely used to make OSAs: diffraction gratings, Fabry-Perot ("FP") filters, and Michelson interferometers. A tunable FP filter ("TFPF") has many advantages for OSA. Principal among these are its relatively simple design, small size, fast speed, ease of control, and its great sensitivity for distinguishing optical signals that are very closely spaced (i.e., signals that have frequencies or wavelengths that are very nearly the same.)

Lensed tunable FP interferometers ("FPIs") have long played an important role in optical spectrum measurements in physics, chemistry, astronomy and other diverse scientific fields. Miniature lensed FPIs adapted to fiber optical systems can provide medium resolution tuning (finesse=100). Lensless fiber FPIs ("FFPIs"), however, can perform at resolutions greater than 500 for tuning functions in optical fiber systems. Such high performance tunable FFPIs have enabled interrogator systems for accurately measuring wavelength responses of passive or active fiber optics devices.

The optical resolution of an OSA is the minimum wavelength spacing between two spectral components that can be reliably resolved. To achieve high optical resolution, the filter should have a sufficiently narrow 3-dB bandwidth ("BW"). Additionally, for many measurements the various spectral components to be measured are not of equal amplitudes, in which case the BW of the filter is not the only concern. Filter shape, which is specified in terms of the optical rejection ratio ("ORR") at a certain distance (e.g., ±25 GHz) away from the peak of the transmission, is also important. Examples include measuring of side-mode suppression of a distributed feedback ("DFB") laser, and measuring the optical signal-to-noise ratio ("OSNR") of the various wavelength channels in WDM optical communications systems.

The wavelength scanning range of the FP filter OSA is limited by its free spectrum range ("FSR"). For the same finesse value, the FP filter's BW is proportional to its FSR, which means the larger the FSR, the larger the BW and the poorer the resolution. Thus for many FP filter OSA applications, there are two major challenges. One challenge is to achieve a very high dynamic range for optical signal-to-noise ratio ("S/N") measurements (for example, for characterizing a dense wavelength division multiplexing ("DWDM") system). The other is to achieve a very wide scanning range of wavelengths (for example, from 1260 nm to 1640 nm) while maintaining a sufficiently narrow bandwidth. Enhancing the OSNR should not compromise the wavelength scanning range. Enhancing the wavelength scanning range should not compromise the OSNR. The real challenge is to achieve a higher OSNR and a broader wavelength at the same time.

Known FP filter OSAs have a limited wavelength scanning range due to the filter's FSR, which is the spectral separation between adjacent FP orders (optical orders) that can be tuned without overlap. FSR is inversely proportional to the cavity length of the FP filter. By reducing the cavity length, the FP filter can have a very large FSR. By increasing the cavity length, the FP filter can have a very small FSR. A FP filter's FSR is also proportional to the mathematical product of the filter's BW and its finesse. For the same finesse value, by increasing the cavity length and thus reducing the FSR, we can fabricate a FP filter with a very narrow 3-dB BW, thus providing very good spectral resolution. If the BW becomes smaller, the finesse needs to be larger to maintain the same FSR. For the same finesse value of the FP filter, the larger the FSR, the larger the BW. This is not desirable in many applications since the larger the BW, the poorer the spectral resolution. Thus, in using a FP filter to construct an OSA, the FP filter's FSR will limit the filter's wavelength scanning range.

In many technical situations, precision OSA, chromatic dispersion ("CD"), and polarization mode dispersion ("PMD") measurements must be made. This requires utilizing multiple instruments, which can be quite inconvenient in temporary or field locations that require the instruments to be carried to the site and then individually connected to local optical networks and individually operated to perform the various measurements. It would therefore be advantageous to combine such OSA, CD, and PMD measurement functionality into a single, multi-functional module. This would not only save substantial component costs by reducing the redundancy of common components (e.g., power supplies), but would also open the possibility of utilizing sophisticated components, such as a FP filter, for all such measurements, resulting in significant cost savings along with significantly improved test instrument performance.

Unfortunately, prior devices have heretofore not been able to effectively, economically, and satisfactorily combine precision OSA, CD, and PMD measurements. For instance, prior devices have been unable to utilize just a single FP filter for all such measurements across the full range of optical communications wavelengths (e.g., from 1260 nm to 1640 nm). One unsolved technical obstacle, for example, has been that such a FP filter not only needs to be operated very precisely across the full optical communications wavelength range, but also needs to be operated in a scanning mode for OSA and PMD measurements, but in a stepping mode for CD measurements.

Thus, a need still remains for high-performance, high precision, integrated measurement systems that can provide and perform OSA, CD, and PMD measurements across the broad wavelength range from 1260 to 1630 nm, for DWDM and CWDM ("coarse wavelength division multiplexing") applications. A need remains for such systems that can perform such analyses for the full optical communications bands. A need further remains, in particular, for such systems that efficiently provide these functions employing but a single TFPF for the measurement of wavelengths of light. A still further need remains for such single TFPF systems that efficiently provide these functions over such broad, and even further extended, wavelength ranges.

In view of the ever-increasing commercial competitive pressures, increasing consumer expectations, and diminishing opportunities for meaningful product differentiation in the marketplace, it is increasingly critical that answers be found to these problems. Moreover, the ever-increasing need to save costs, improve efficiencies, improve performance, and meet such competitive pressures adds even greater urgency to the critical necessity that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides an optical signal measurement system. The optical signal measurement system has a tunable Fabry-Perot ("FP") optical filter, and an unknown optical signal is scanned through the tunable FP optical filter. By operating the FP filter in a scan mode, the wavelength, power, OSNR, and PMD information of an unknown signal can be measured. By operating the FP filter is a stepping mode, the chromatic dispersion of the optical signal can be measured.

Certain embodiments of the invention have other aspects in addition to or in place of those mentioned above. The aspects will become apparent to those skilled in the art from a reading of the following detailed description when taken with reference to the accompanying drawings.

BRIEF DESCRIPTION OF THE DRAWINGS

FIG. 1 is a schematic representation of a tunable Fabry-Perot interferometer;

FIG. 2 is a vector diagram depicting the light beams and attendant electric fields in the tunable Fabry-Perot interferometer of FIG. 1;

BEST MODE FOR CARRYING OUT THE INVENTION

Figure 3:
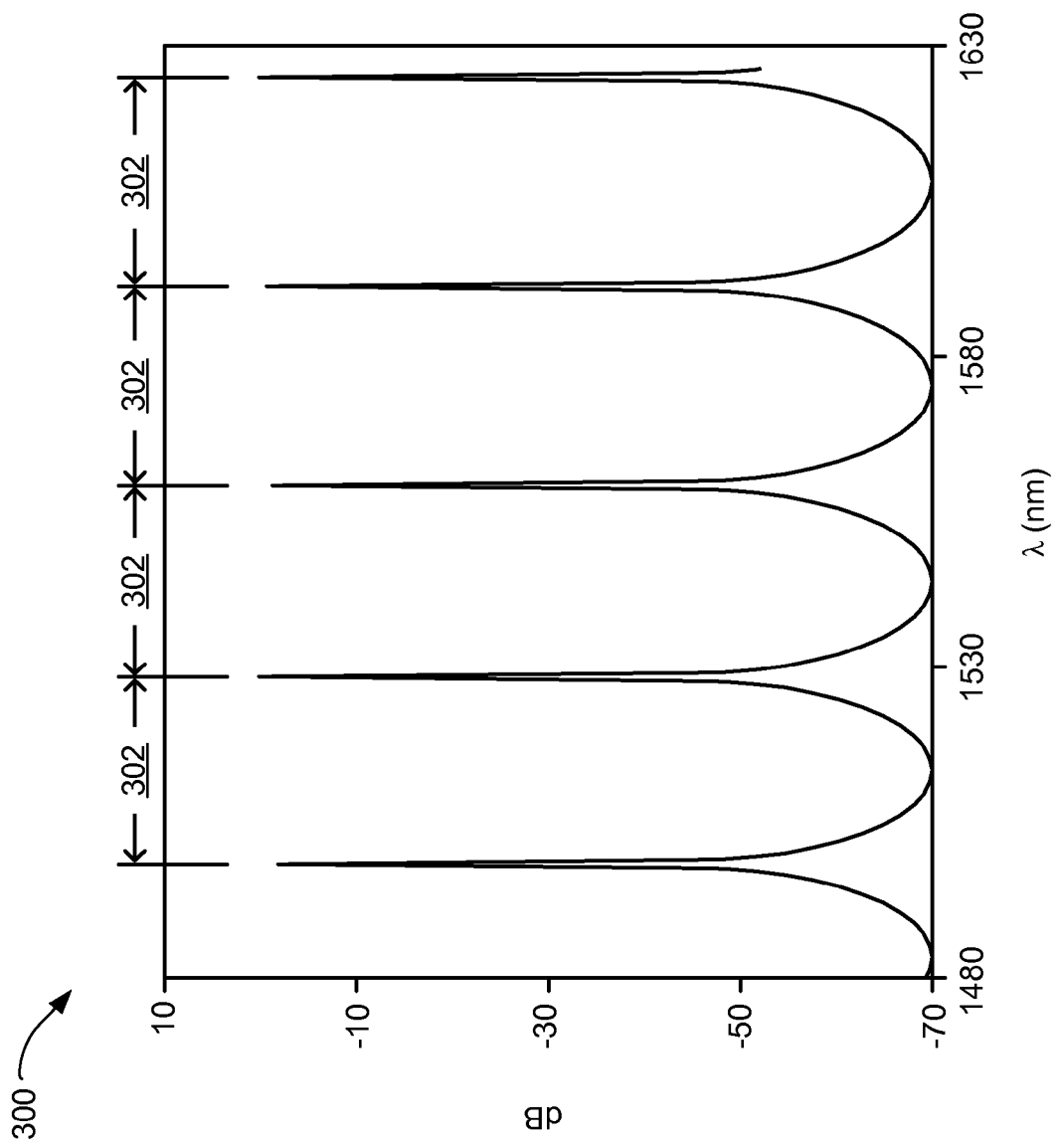
FIG. 3 is a graph of an Airy Function usable to describe the transmission profile of a Fabry-Perot filter.

In the following description, numerous specific details are given to provide a thorough understanding of the invention.

However, it will be apparent that the invention may be practiced without these specific details. In order to avoid obscuring the present invention, some well-known circuits and system configurations are not disclosed in detail. Likewise, the drawings showing embodiments of the apparatus are semi-diagrammatic and not to scale and, particularly, some of the dimensions are for the clarity of presentation and are shown exaggerated in the drawing FIGS. In addition, where multiple embodiments are disclosed and described having some features in common, for clarity and ease of illustration, description, and comprehension thereof, similar and like features one to another will ordinarily be described with like reference numerals.

According to the present invention, there are disclosed systems for the measurement of wavelengths and dispersion of light. More particularly, accurate measurement systems have been discovered and are disclosed that unexpectedly achieve significantly improved accuracy over extended wavelength ranges while enabling the combination into a single system of a Fabry-Perot ("FP") filter-based optical spectrum analyzer ("OSA"), chromatic dispersion ("CD"), and polarization mode dispersion ("PMD") measurement system. The present invention thus substantially advances the state of the art of devices for optical wavelength scanning, optical spectrum analysis, chromatic, and polarization mode dispersion measurement utilizing Fabry-Perot interferometers ("FPIs").

It has been discovered that a FP filter can be utilized to scan a broad wavelength range that is substantially larger than the FP filter's inherent free spectrum range ("FSR"), while maintaining a sufficiently narrow bandwidth ("BW") and thus maintaining excellent spectral resolution.

The present invention employs a single FPI for the full broad- and inter-band multi-wavelength measurements for all three OSA, CD, and PMD measurements. In this regard, it has been discovered that a full band OSA with a wavelength scanning range of 380 nm or more can be implemented utilizing a single tunable FP filter. In one embodiment, the FP filter has a FSR of about 180 nm and a 3-dB BW less than 80 pm between 1460 nm and 1650 nm. In another wavelength region, from about 1260 nm to 1470 nm, the FSR is slightly smaller. Well-defined band pass filters ("BPFs") are then used to enable multiple optical orders of the FP filter to scan a very broad wavelength range, e.g., from 1260 nm to 1640 nm, which covers the full telecommunication ("telecom") wavelength bands, e.g. the O, E, S, C, and L bands. Depending upon the isolation of the BPFs, optical signal isolation between different bands can be greater than 45 dB. The FP filter-based OSA in this embodiment then has a wavelength scanning range much greater than the FP filter's FSR.

Figure 4:
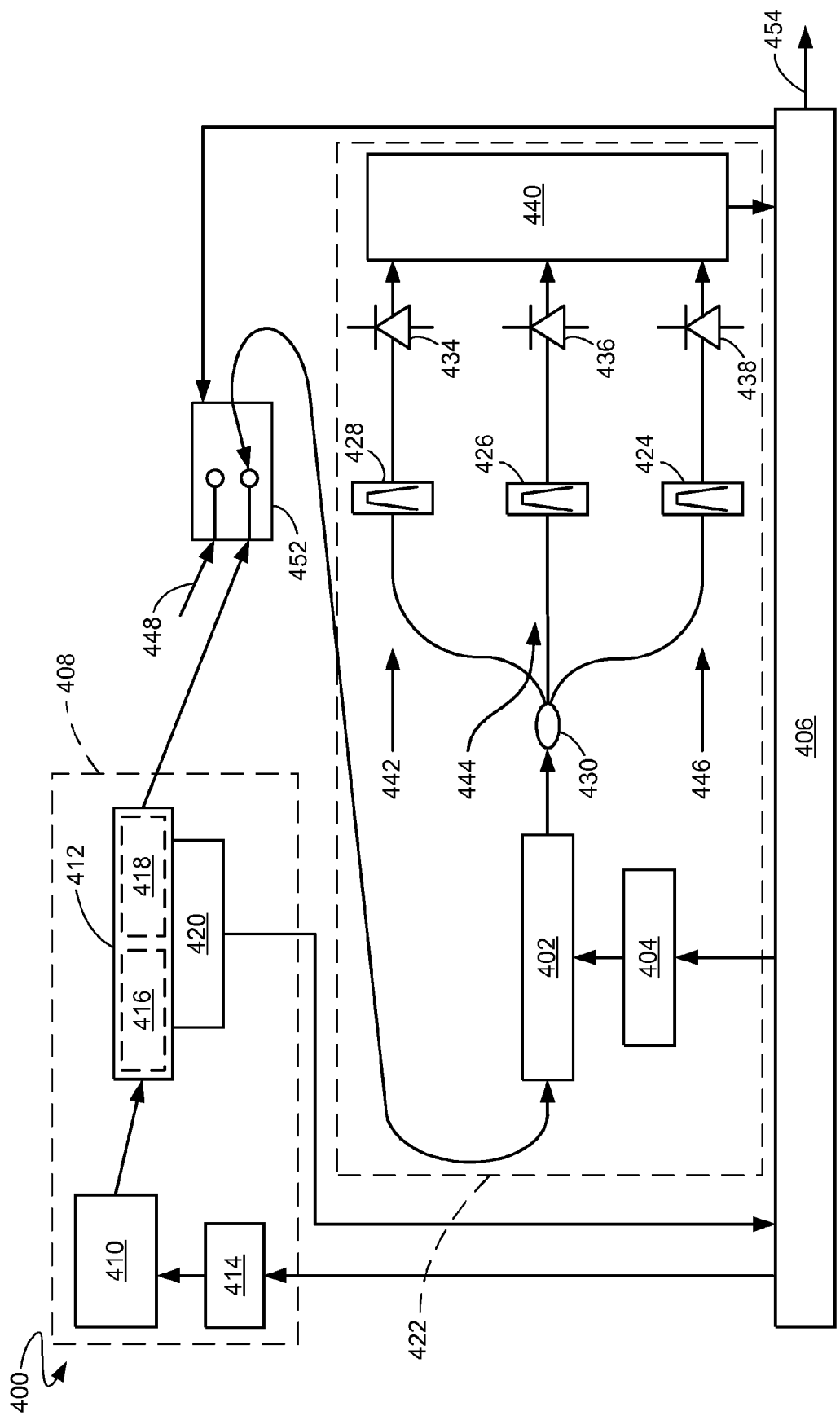
FIG. 4 is an optical circuit schematic diagram of a full band optical spectrum analyzer according to an embodiment of the present invention.

Referring now to FIG. 1, therein is shown a schematic representation of a tunable FPI 100, utilized in the present invention as the tunable FP filter ("TFPF") 402 (not shown, but see FIG. 4) in the full band OSA 400 (FIG. 4). The tunable FPI 100 has mirrors 102 and 104 defined therein that are partially reflective. The mirrors 102 and 104 are separated by a gap, such as a cavity 106, filled with an appropriate dielectric medium such as air, glass, and so forth. Light rays 108 enter the tunable FPI 100, pass through it, and then exit the tunable FPI 100 as transmitted, filtered light rays 110.

Referring now to FIG. 2, therein is shown a vector diagram 200 depicting the interactions and the analysis of the incident, reflected, and transmitted light beams and their attendant electric fields in a FP filter with an air gap. The incident electric field $R_0$ of the light rays 108 is partially reflected at the mirror 102 with a factor of $r_o$ (for "reflected outside" the cavity 106), and partially transmitted with a factor $t_i$ (for "transmitted inside" the cavity 106). When the transmitted electric field with factor $t_i$ in the cavity 106 passes out of the cavity 106 through the mirror 104, it appears delayed and multiplied with factor $t_o$ behind the mirror 104. The reflected rays $R_1$, $R_2$, $R_3$, and so on, from the mirror 102, will experience maximum destructive interference, and the transmitted rays $T_1$, $T_2$, $T_3$, and so on, from the mirror 104, will experience maximum constructive reinforcement, when the following equation is met:

$$\frac{2\pi n L}{\lambda} = m\pi, \tag{1}$$

where:
  m is any integer>0,
  L (FIG. 2) is the length of the resonant cavity (e.g., the cavity 106),
  n is the refractive index of the medium inside the resonant cavity, and
  λ is the wavelength of the optical signal and hence of the transmitted light wave.

Referring now to FIG. 3, therein is shown a graph 300 of an Airy Function $A(\lambda)$ that can be used to describe the transmission profile of a FP filter:

$$A(\lambda) = \frac{I_0}{1 + \left(\frac{2F}{\pi}\sin\frac{2\pi n L}{\lambda}\right)^2}, \tag{2}$$

where:
  $I_o$ is the peak transmission optical intensity,
  F is the finesse of the FP filter, and
  λ is the wavelength of the light wave.

The following equation establishes the resonant frequencies $f_m$ of the tunable FPI 100:

$$f_m = \frac{c}{2Ln}m \tag{3}$$

The mode spacing is defined as the free spectrum range ("FSR") 302 of the tunable FPI 100. In terms of the frequency f of the light wave, its FSR 302 is:

$$FSR(f) = \frac{c}{2Ln} \tag{4}$$

In terms of the wavelength λ of the light wave, its FSR 302 is:

$$FSR(\lambda) = \frac{\lambda^2}{2Ln} \tag{5}$$

For a FP filter with a FSR 302 of about 180 nm in the 1500 nm region, the cavity length is about 12.5 µm.

The BW of the tunable FPI 100 is defined as the full width at half maximum ("FWHM"). It is defined by the following equation (Hz):

$$BW = \frac{1-r}{\sqrt{r}} \frac{c}{2\pi n L} \quad (6)$$

where:
r is the reflectivity of the filter mirrors,
c the speed of light in a vacuum,
n the index of refraction of the media inside the filter cavity, and
L the length of the filter's cavity (e.g., the cavity 106).

Relating the BW to the mode spacing, e.g. the FSR 302, yields the finesse F:

$$F = \frac{FSR}{BW} = \frac{\pi\sqrt{r}}{1-r} \quad (7)$$

The Airy Function $A(\lambda)$ can be approximated by the following Lorentzian distribution:

$$L(f) = \frac{I_0}{1 + 4\left(\frac{f-f_0}{BW}\right)^2}, \quad (8)$$

$$\left(\text{for } \frac{f-f_0}{FSR} \ll 1\right)$$

where:
f is the frequency of the transmitted light-wave,
$f_o$ is the peak transmission frequency, and
FSR is the free spectrum range of the FP filter.

The 3-dB BW of the Lorentzian distribution is the same as that of the FP filter.

For dense wavelength division multiplexing ("DWDM") applications in fiber optical communications, the requirement for the filter BW is in the range of several tens of picometers. In former FP filter OSA implementations, the wavelength scanning range of the FP filter OSA was slightly smaller than its FSR.

However, it has been discovered, as taught herein, that these technology hurdles can be overcome through the simultaneous use of multiple FSRs 302 that can be configured to perform the desired scan simultaneously. This makes it possible to maintain and utilize commercially practical FSRs and BWs by concatenating multiple FSRs together.

According to an embodiment of the present invention, and referring now to FIG. 4, therein is shown an optical circuit schematic diagram of a full band OSA 400 employing a tunable optical filter such as the TFPF 402. The cavity length of the TFPF 402 used in the full band OSA 400 is driven conventionally by a piezoelectric transducer (not shown), which is controlled through a suitable digital-to-analog converter ("DAC") circuit 404 by a controller/analyzer 406.

According to equation (1) above, the resonant optical wavelength of the TFPF 402 is a function of its cavity length L (FIG. 2). However, equation (1) also shows that at the same cavity length, separate multiple optical wavelengths can resonate simultaneously, with each such wavelength at a different optical order m. The FSR 302 (FIG. 3) of the TFPF 402 defines the maximum wavelength range that the filter can scan without interference of signals from its neighboring optical orders. As shown by the previous FSR examples for FP filters, this explains the very limited wavelength ranges of existing OSAs that are based on FP filters.

These limitations are overcome herein by utilizing multiple optical orders of the TFPF 402 to scan across different wavelength bands simultaneously, through the use of well-defined BPFs. In one embodiment, the TFPF 402 of the full band OSA 400 has a FSR 302 of about 180 nm (in the 1550 nm region) and 3-dB BW of about 50 pm. With BPFs as described more particularly hereinbelow, multiple optical orders of the TFPF 402 can be used to scan across different wavelength bands simultaneously. The full band OSA 400 can thus be used to scan across a wavelength range much larger than the FSR 302 of the TFPF 402, for example from 1260 nm to 1640 nm, which covers the full wavelength bands (O, E, S, C, and L bands) for telecom applications. The present invention thus employs an OSA for full telecom band applications using a single FP filter.

In one embodiment, the full band OSA 400 contains a wavelength reference arm 408 that has a light source 410 and a filter 412 defined therein. The light source 410 is a broad band LED, for example centered around 1550 nm, controlled by the controller/analyzer 406 through a driver 414. The filter 412 includes a fixed cavity length FPI 416, which has a FSR of about 100 GHz (800 pm) and a BW of about 80 pm. The fixed cavity length FPI 416 is combined with a fiber Bragg grating ("FBG") such as a FBG 418 with a 1 nm BW to block one of its resonant peaks at around 1550 nm. The wavelength reference arm 408 with the fixed cavity length FPI 416 and the FBG 418 thus constitutes a wavelength reference system with picometer accuracy. A thermistor 420 provides temperature calibration information about the filter 412 to the controller/analyzer 406.

The fixed cavity length FPI 416 is a fixed cavity length FPI with a fixed FSR of, for example, 100 GHz. The FBG 418 has a BW slightly larger than that of the resonant peaks of the fixed cavity length FPI 416. The FBG 418 has a notching position that is pre-defined to block one of the resonant peaks of the fixed cavity length FPI 416. This combination of the LED light source 410, the fixed cavity length FPI 416, and the FBG 418 is then able to provide a precise wavelength reference with accuracy that is less than 1 pm for the wavelength range between 1460 nm to 1650 nm.

The full band OSA 400 also contains a light detection arm 422 that has the TFPF 402 and the DAC circuit 404 defined therein. In addition, the light detection arm 422 has BPFs 424, 426, and 428, a three-way splitter 430, detectors 434, 436, and 438, and circuitry such as an analog-to-digital converter ("ADC") 440 defined therein. The BPF 428 and the detector 434 define a first detection channel 442, for example, for the O telecom band. The BPF 426 and the detector 436 define a second detection channel 444, for example, for the E telecom band. The BPF 424 and the detector 438 define a third detection channel 446, for example, for the S, C, and L ("S-C-L") telecom bands.

The outputs of the first, second, and third detection channels 442, 444, and 446 are respectively connected to the ADC 440, which processes the outputs into digital form and forwards the respective data to the controller/analyzer 406. The light detection arm 422 is thus configured for scanning across a wavelength range that is larger than the FSR 302 of the TFPF 402, and the detection channels 442, 444, and 446 are configured for simultaneously and individually detecting separate multiple optical orders of the wavelengths scanned and filtered by the TFPF 402.

An unknown optical signal, such as a wavelength division multiplexing ("WDM") signal, is provided on an input 448 for the full band OSA 400, the input 448 being connected to an optical switch 452. Before the full band OSA 400 scans the unknown WDM signal from the input 448, the optical switch 452 is set to the wavelength reference arm 408 that is configured to provide wavelength reference and calibration information to the TFPF 402. The wavelength reference and calibration information is then scanned and the results saved in the controller/analyzer 406.

The optical switch 452 is then set to connect to the unknown WDM signal on the input 448 and a scan is again taken, this time on the unknown WDM signal from the input 448, with the TFPF 402 filtering the unknown optical signal therethrough. The resulting outputs from the first, second, and third detection channels 442, 444, and 446 are then analyzed as described below to provide the full band spectrum analysis, on an output 454, of the unknown WDM signal from the input 448.

To detect the three telecom bands as described, the BPFs 424, 426, and 428 in one embodiment have the following values:
BPF 424: pass from ~1457 nm to ~1650 nm, blocking other wavelengths;
BPF 426: pass from ~1345 nm to ~1490 nm, blocking other wavelengths;
BPF 428: pass from ~1260 nm to ~1378 nm, blocking other wavelengths.

This produces and defines a wavelength detection range 508 (see FIG. 5) of 1260 nm to 1378 nm for the first detection channel 442, a wavelength detection range 510 (see FIG. 5) of 1345 nm to 1490 nm for the second detection channel 444, and a wavelength detection range 512 (see FIG. 5) of 1457 nm to 1650 nm for the third detection channel 446.

In another embodiment, the passing bands of the BPFs 424, 426, and 428 can be slightly different. For example:
BPF 424: pass from ~1465 nm to ~1650 nm, blocking other wavelengths;
BPF 426: pass from ~1350 nm to ~1480 nm, blocking other wavelengths;
BPF 428: pass from ~1260 nm to ~1370 nm, blocking other wavelengths.

The passing bands of pairs of adjacent BPFs thus have some overlap, for example an overlap of 10 nm to 30 nm wide. However, while this overlap has been discovered to be beneficial, the overlap should not be so wide that signals from different optical orders are not distinguished.

Figure 5:
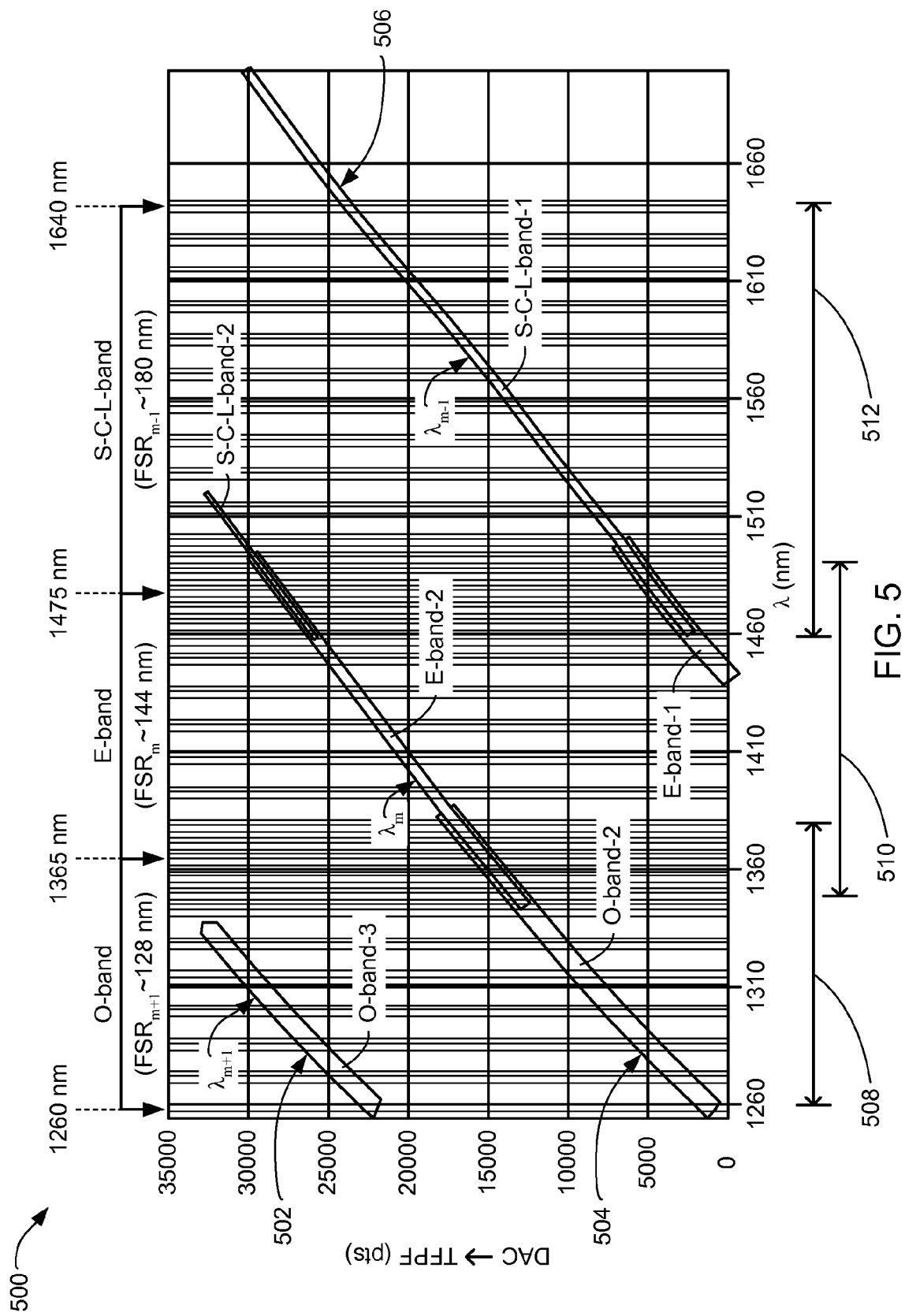
FIG. 5 is a graph depicting the multiple optical orders of the optical filter of FIG. 4, and depicting seamless optical spectrum analysis over the full telecom wavelength range.

Referring now to FIG. 5, therein is shown a graph 500 depicting the multiple optical orders of the TFPF 402 (FIG. 4), and the system disclosed in the present invention for seamless OSA scanning therewith over the full telecom wavelength range of 1260 nm to 1640 nm. The various filters (for example, the BPFs 424, 426, and 428 (FIG. 4)) are well defined, as described above, to provide appropriate blocking on the neighboring optical orders, the $m+1^{th}$ and $m-1^{th}$ optical orders, of the $m^{th}$ optical order. Thus, in the embodiment described above in connection with FIG. 4, the BPF 424 for the S-C-L bands has a pass channel from about 1457 nm to 1650 nm (the wavelength detection range 512) and blocks signals from other wavelength bands. The BPF 426 for the E band has a pass channel from about 1345 nm to 1490 nm (the wavelength detection range 510) and blocks signals from other wavelength bands. The BPF 428 for the O band has a pass channel from about 1260 nm to 1378 nm (the wavelength detection range 508) and blocks signals from other wavelength bands.

In operation, the DAC circuit 404 (FIG. 4) controls the cavity length of the TFPF 402 in a sweeping mode to define a scan as the TFPF 402 is continuously tuned over the different wavelength components through time across the unknown WDM signal of the input 448 (FIG. 4). In FIG. 5, the Y-axis ("DAC→TFPF") is the DAC circuit 404 input reading (in points) to the TFPF 402, which is proportional to the voltage controlling the piezoelectric transducer ("PZT") (not shown) in the TFPF 402. The X-axis is the resonant wavelength λ of the TFPF 402, which corresponds to the instant cavity length of the TFPF 402. As is known in the art, this cavity length is a function of the PZT's controlling voltage, as just described.

In FIG. 5, the six curves ("O-band-3", "O-band-2", "E-band-2", "S-C-L-band-2", "E-band-1", and "S-C-L-band-1") show how the resonant wavelength of the TFPF 402 responds to the controlling points from the DAC circuit 404 for different optical orders. The six curves can be joined into three extended curves, wherein the O-band-3 curve is a first extended curve 502, the O-band-2, E-band-2, and S-C-L-band-2 curves are a second extended curve 504, and the E-band-1 and S-C-L-band-1 curves are a third extended curve 506. The three extended curves 502, 504, and 506 show three respective different optical orders for $\lambda_{m+1}$, $\lambda_m$, and $\lambda_{m-1}$ of the TFPF 402.

As an example, when the DAC circuit 404 sends out points at about 1190 (just above the X-axis), the signals at about 1260 nm and about 1455 nm will start to resonate at the same time. However, the detector 434 (FIG. 4) for the O band will see only the 1260 nm signal, in its wavelength detection range 508. It cannot see the 1455 nm signal, which is outside its wavelength detection range 508 due to the blocking by the BPF 428 for the first detection channel 442 (FIG. 4).

As the DAC circuit 404 input increases during the spectrum analysis sweep, the resonant wavelength of the TFPF 402 increases, and the process continues until 1378 nm, when the BPF 428 for the O band blocks the signal for its detector 434. However, the detector 436 (FIG. 4) for the E band starts to collect data at about 1345 nm. The signal between 1345 nm and 1378 nm is detected by both the detectors 434 and 436 to provide seamless scanning across the O and E bands.

The detector 436 for the E band continues to collect data until 1490 nm, when the BPF 426 for the E band blocks the signal for its detector 436. The detector 438 (FIG. 4) for the S-C-L bands starts to collect data at about 1457 nm. The region between 1457 nm and 1490 nm is detected by both the E-band and the S-C-L-band detectors 436 and 438 to provide seamless scanning across the E and S-C-L bands.

In one embodiment, the DAC circuit 404 sweeps from 0 to 32768 points. Both Equation (1) and FIG. 5 show that each wavelength may resonate at different optical orders. For example, a signal at 1260 nm would resonate at two different DAC values, approximately 1190 and 22220. A signal at 1460 nm would resonate at another two DAC values, approximately 2190 and 26110. For the O band, any DAC values higher than 17000 points (corresponding to approximately 1380 nm) can then be disregarded to avoid confusion due to these multiple optical orders. Similarly, for the E band, any DAC values lower than 12000 points (corresponding to approximately 1330 nm) can then be disregarded to avoid such confusion. Thus for the whole O and E bands, those DAC points on the curve O-band-3 are not used, which is due to the $(m+1)^{th}$ optical order. For simplicity, the number "3" is used to denote order $(m+1)^{th}$. For the whole O and E bands, only those DAC points on the curve O-band-2 and the curve E-band-2 are used, which is due to the $m^{th}$ optical order. Again, the number "2" is used to denote order $m^{th}$. For the S, C, and L bands, only those DAC points on the curve S-C-L-band-1 are used, which is due to the $(m-1)^{th}$ optical order. For simplicity, the number "1" is used to denote order $(m-1)^{th}$.

It has thus been discovered, as taught herein, that a seamless scan for the full telecom wavelength band, e.g. from 1260 nm to 1650 nm, is possible using an OSA based on a FP filter with FSR much less than the total wavelength span. This wide scanning range is achieved without sacrificing the BW of the filter, as defined by equation (6). With previous techniques and designs for a large wavelength scanning range, a filter with a large FSR greater than the total scanning range has to be used. However, for the same finesse, the larger the FSR, the larger the BW of the filter, and thus the poorer the spectral resolution. This means that previous designs achieve a larger scanning range by sacrificing the spectral resolution. However, the present invention achieves a larger OSA scanning range (i.e., achieves a greater "net FSR") while maintaining the same FSR for each optical order. Thus, the original BW for each optical order of the FP filter is maintained, preserving the high spectral resolution of the filter (comparable to that of the filter's intrinsic FSR) for the entire OSA scanning range.

Another significant improvement afforded hereby is that multiple FSRs or optical orders can be scanned simultaneously, thereby greatly speeding up the scanning process compared with the scanning speed when only a single FSR is scanned at a time.

Accordingly, the several optical orders of the TFPF 402 are completely separated, such that multiple order optical signals can be simultaneously yet distinctly and separately detected and analyzed. Accordingly, the full band OSA is able to successfully and beneficially utilize a single FP filter such as the TFPF 402 to rapidly scan a much broader range that is much larger than the FP filter's own FSR 302 itself.

The isolation provided by the BPFs for the embodiment just described is about 40 dB, which assures a 40 dB measurement range for the optical-signal-to-noise-ratio ("OSNR"). Based on this disclosure, it will now be clear to one of ordinary skill in the art that with better isolation, an even better dynamic range for the OSNR can be provided.

Figure 6:
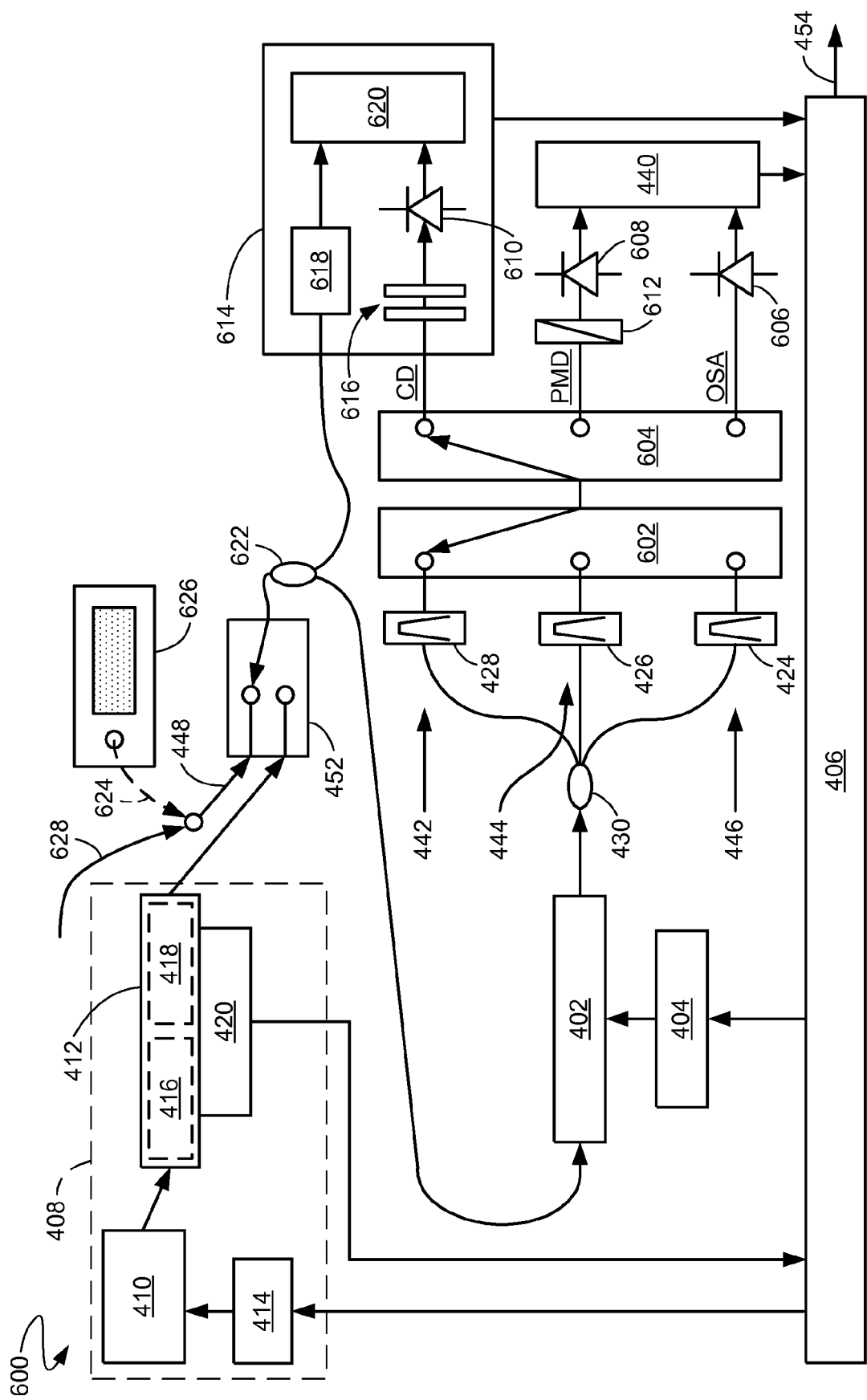
FIG. 6 is a schematic diagram depicting an optical signal measurement system according to an embodiment of the present invention.

Referring now to FIG. 6, therein is shown a schematic diagram depicting an optical signal measurement system 600 according to an embodiment of the present invention. The optical signal measurement system 600 has many components and functions similar to those of the full band OSA 400 (FIG. 4), and these are accordingly indicated with like reference numerals.

A significant difference, however, between the full band OSA 400 and the optical signal measurement system 600, according to the present invention, is that the optical signal measurement system 600 not only performs full-band OSA, but in addition performs full-band CD and full-band PMD measurements as well. It has been unexpectedly discovered that these three important measurement functions (OSA, CD, and PMD) can be combined into a single optical signal measurement system 600 utilizing but a single FPI—namely, the TFPF 402. This is all-the-more surprising and unexpected inasmuch as OSA and PMD measurements are continuous measurements, performed with continuous sweeping of the unknown input signal, whereas CD measurements are step (rather than sweep) measurements, performed in a stepping mode or fashion that is performed by measuring the unknown input signal for set time periods at specific, discrete, spaced wavelength positions.

Because CD measurements are not continuously swept, a very different, and heretofore very difficult, form of control must be implemented over the measurement filter. Such control has been particularly difficult with FP filters, and has therefore led to a preference for other filter configurations, such as FBGs, for CD measurements. However, as discovered and taught herein, it is possible to economically and efficiently combine all three measurement functions (OSA, CD, and PMD) utilizing but a single FPI, and to realize measurement accuracies and performance for all three measurement functions that are superior to those available at greater cost in various prior art multiple, separate measurement systems.

A principle difficulty with prior CD measurements that use a DAC to control a FPI (e.g., use the DAC circuit 404 to control the TFPF 402) is to know exactly where to set the DAC circuit 404 at a value to obtain exactly the wavelength desired from the TFPF 402. This requires a very high degree of stability that has not been affordably known heretofore. For example, upon changing the DAC circuit 404's value for one step measurement to the value for the next step measurement, the TFPF 402 will be stepped accordingly by the DAC circuit 404 to the position for filtering the next wavelength. However, the TFPF 402 is a physical device and therefore does not transition instantaneously to the exact next value. Rather, the actual physical wavelength setting of the TFPF 402 may drift a little, or may shift constantly, making it very hard to maintain the accuracy of the TFPF 402 for the ensuing measurement.

In the present invention, therefore, stability, precise control, and precision calibration of the optical signal measurement system 600 are valuable new elements and features not heretofore known. Therefore, a description hereinbelow of calibration and operation will follow a description of the optical signal measurement system 600 itself.

As can be seen by referring to FIG. 6, the optical signal measurement system 600 incorporates most of the components previously described in connection with the full band OSA 400 (FIG. 4), and thereby takes advantage of the full wavelength-band capabilities of the full band OSA 400 and the TFPF 402 therein. But in addition, as indicated above, the TFPF 402 is further used in the optical signal measurement system 600 to perform dispersion measurements, such as CD and PMD measurements, for optical fibers. A single FP filter such as the TFPF 402 thus performs OSA, CD, and PMD analysis for the full wavelength bands (e.g., 1260 nm to 1640 nm, covering the full O, E, S, C, and L bands).

The optical signal measurement system 600 includes two 1×3 optical switches, a first optical switch 602 and a second optical switch 604. Each of the three ports of the first optical switch 602 is connected respectively to the first, second, and third detection channels 442, 444, and 446 for the respective optical paths for the O, E, and S-C-L bands. Each of the three ports of the second optical switch 604 is connected respectively to OSA, PMD, and CD detection channels (labeled respectively "OSA", "PMD", and "CD") having respectively an OSA detector 606, a PMD detector 608, and a CD detector 610.

The OSA detection channel is for OSA measurements and includes the OSA detector 606, which passes its detection results to the ADC 440, which processes the outputs from the OSA detector 606 into digital form and forwards the respective data to the controller/analyzer 406.

The PMD detection channel is for PMD measurements and includes the PMD detector 608 and a polarizer 612. The polarizer 612 receives the optical signal from the second optical switch 604, polarizes the optical signal, and forwards it to the PMD detector 608. The PMD detector 608 passes its detection results to the ADC 440, which processes the outputs from the PMD detector 608 into digital form and forwards the respective data to the controller/analyzer 406.

The CD detection channel is for CD measurements, and in one embodiment is configured on a CD daughter board 614 that includes two FBGs 616, a clock 618, and a time-to-digital converter ("TDC") 620. The CD board 614 receives the optical signal from the second optical switch 604, processes it as further described herein, and forwards the respective output data to the controller/analyzer 406.

For full band OSA measurements, the operation of the optical signal measurement system 600 is as described above, with the second optical switch 604 set to the OSA channel containing the OSA detector 606. The TFPF 402 is operated in a scanning mode, with the first optical switch 602 operated to select the various first, second, and third detection channels 442, 444, and 446 for the O, E, and S-C-L bands, respectively, that are to be scanned.

For full band PMD measurements, the operation of the optical signal measurement system 600 is also done by operating the TFPF 402 in a scanning mode, but with the second optical switch 604 set to the PMD channel containing the PMD detector 608. The first optical switch 602 is similarly operated to select the various first, second, and third detection channels 442, 444, and 446 for the O, E, and S-C-L bands, respectively, that are to be scanned.

PMD measurement that is based on a tunable filter configuration such as disclosed herein is called the "Fixed Analyzer Method". The continuously swept PMD scan is completed, and the power received by the PMD detector 608 in the PMD path is recorded by the controller/analyzer 406 as $P_p(\lambda)$. Similarly, the power received by the OSA detector 606 in the OSA path is recorded by the controller/analyzer 406 as $P_{Tot}(\lambda)$. A power ratio $R(\lambda)$ (called the "$R(\lambda)$-function" or simply the "R-function") is then calculated as follows.

$$R(\lambda) = \frac{P_p(\lambda)}{P_{Tot}(\lambda)} \quad (9)$$

There are two methods of calculating PMD from the $R(\lambda)$ function that is measured, e.g., extrema counting and Fourier transform. If using the extrema counting method, the $R(\lambda)$ function should be obtained at equally spaced wavelength intervals from a minimum wavelength of $\lambda_1$ to a maximum wavelength of $\lambda_2$. N is the number of extrema (both maximums and minimums) within the window. Alternatively, the wavelength range can be redefined so that $\lambda_1$ and $\lambda_2$ coincide with extrema, in which case N is the number of extrema (including $\lambda_1$ and $\lambda_2$) minus one. The formula for the PMD value, $<\Delta\tau>$, is:

$$<\Delta\tau> = \frac{kN\lambda_1\lambda_2}{2c(\lambda_2 - \lambda_1)} \quad (10)$$

where:
c is the speed of light in a vacuum, and,
k is a mode-coupling factor that equals 1.0 in the absence of strong mode coupling and 0.82 in the limit of strong mode coupling.

Figure 7:
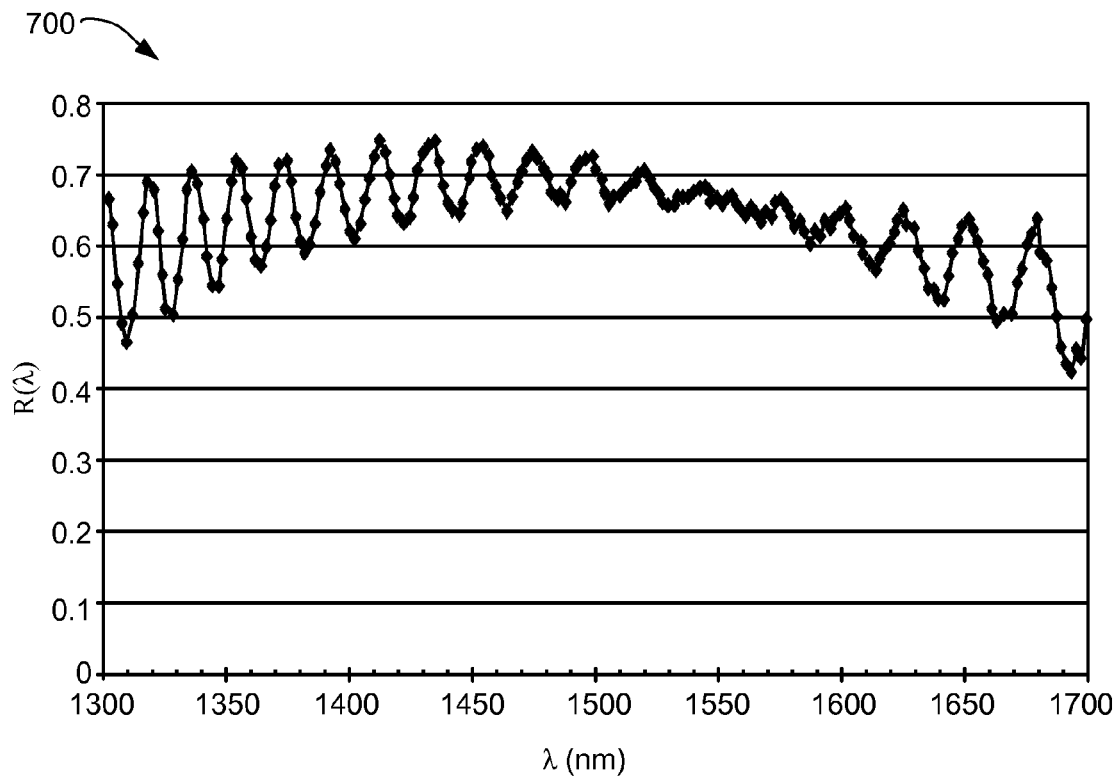
FIG. 7 is a graph according to the present invention of the R-function for the fixed analyzer PMD measurement method with weak mode coupling.

Referring now to FIG. 7, therein is shown a graph 700 according to the present invention of the power ratio function $R(\lambda)$ for the fixed analyzer method with weak mode coupling.

Figure 8:
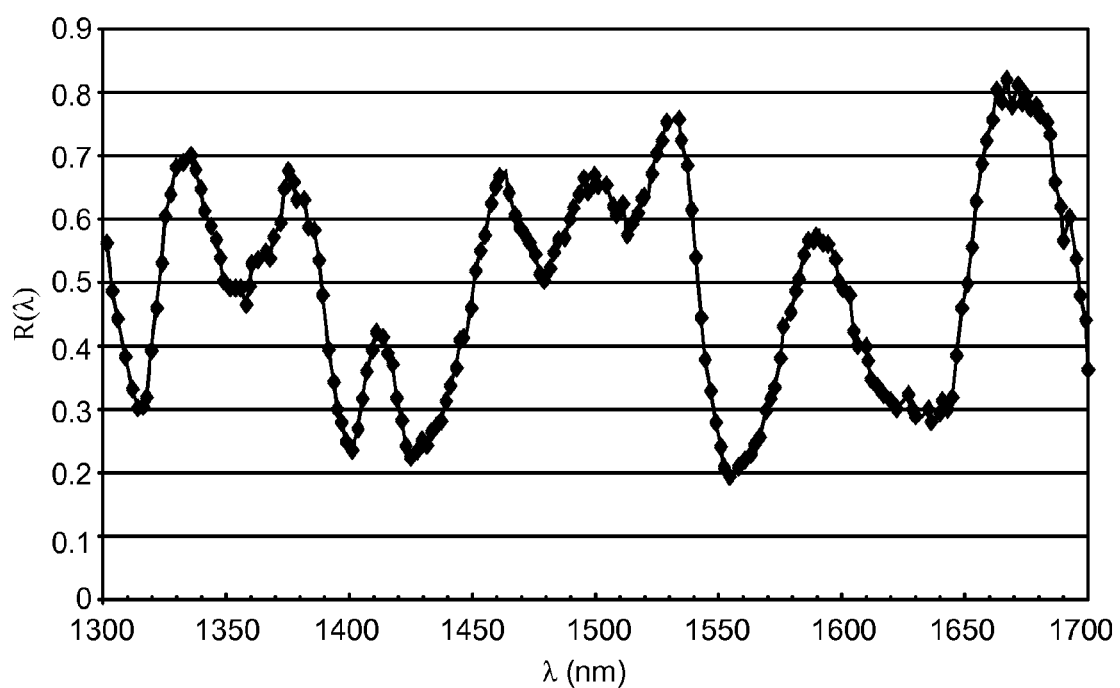
FIG. 8 is a graph according to the present invention of the R-function for the fixed analyzer method with strong mode coupling.

Referring now to FIG. 8, therein is shown a graph 800 according to the present invention of the power ratio function $R(\lambda)$ for the fixed analyzer method with strong mode coupling.

For full band CD measurements, and referring again to FIG. 6, the operation of the optical signal measurement system 600 is done by operating the TFPF 402 in a stepping mode, with the second optical switch 604 set to the CD channel containing the CD detector 610. The first optical switch 602 is operated as desired to select the various first, second, and third detection channels 442, 444, and 446 for the O, E, and S-C-L bands, respectively, that are to be scanned.

More particularly, the CD measurement in one embodiment, which is based upon the TFPF 402 configuration, uses a "Time Delay Method" that measures the relative time delay at each of different stepped wavelengths. The CD is then inferred from the measurement of the relative group delay that is experienced by various wavelengths during propagation through a known length of fiber. The group delay is measured in the time domain by detecting, recording, and processing the delay experienced by pulses at each of the various stepped wavelengths.

Figure 9A:
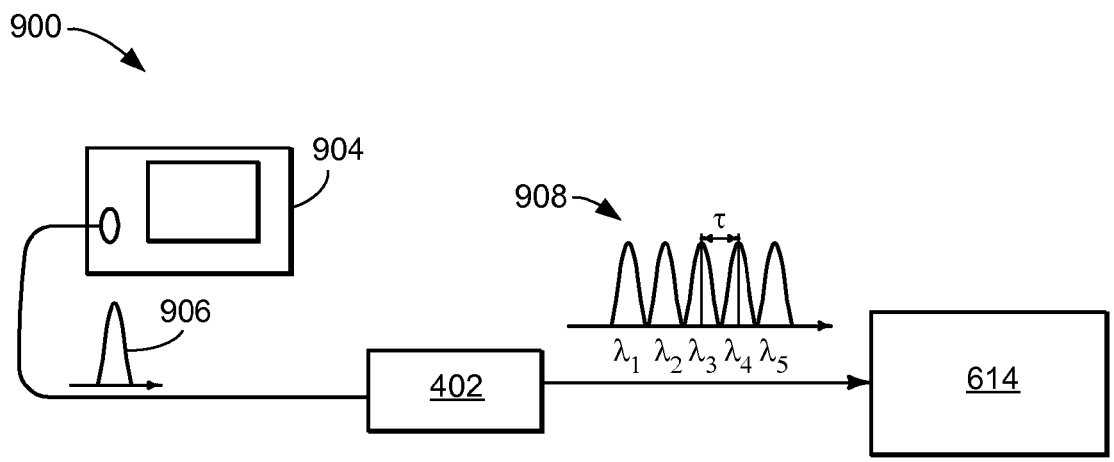
FIG. 9A is a schematic drawing showing group delay measurement when no fiber is under test.
Figure 9B:
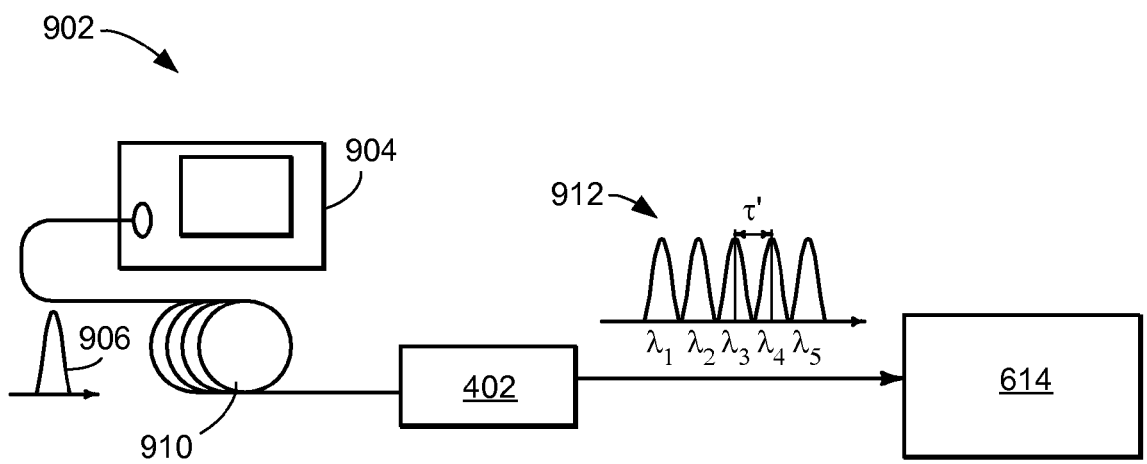
FIG. 9B is a schematic drawing, similar to FIG. 9A, in which a fiber is under test.

Referring now to FIGS. 9A and 9B, therein are shown respective schematic drawings 900 and 902 which show how the group delay is measured. In FIG. 9A, an external LED 904 contains a broadband light-emitting diode that is driven by a pulsar to emit a 500-ps-long optical pulse 906. If there is no fiber under test, the pulse 906 goes though the TFPF 402 only, which works in a stepping mode and generates a series of pulses 908, one at each wavelength $\lambda$, separated by delay $\tau$. If, as shown in FIG. 9B, there is fiber 910 under test, then during the propagation of the pulses 906 through the fiber, chromatic dispersion modifies the delay between the series of pulses 912, for example, to $\tau'$. The time resolved detection in the CD board 614 measures this new delay. The difference $\tau'-\tau$ is the Group delay, from which chromatic dispersion can be inferred. Photon counting detection is employed to obtain the high sensitivity and high temporal resolution desired. Such photon counting is known, as described, for example, in "Photon-counting techniques for fiber measurements" (Bruno Huttner and Jurgen Brendel), LIGHTWAVE, August 2000.

Referring again to FIG. 6, to operate the TFPF 402 in a stepping mode, the CD board 614 is time-synchronized with the unknown optical signal or other optical signal under measurement. This is accomplished by passing the optical signal under measurement (e.g., a signal on an optical signal input line 628) from the optical switch 452 through a two-way splitter 622. The two-way splitter 622 sends the optical signal under measurement to both the TFPF 402 and the clock 618 on the CD board 614. The clock 618 then synchronizes to that signal, which is the same optical signal that is simultaneously sent to the TFPF 402 from the two-way splitter 622.

In operating the TFPF 402 in a stepping mode, the TFPF 402 must be stabilized at each selected, precise wavelength of each discrete step during the measurement period. Before each CD measurement, the optical switch 452 is directed to the wavelength reference or calibration arm 408. The TFPF 402 is working in a sweeping mode. The optical switch 604 is directed to the OSA arm. The TFPF 402 is swept through the calibration optical spectrum with multiple resonant wavelength peaks due to FPI 416 and a missing peak. The wavelength position of these peaks is known due to the known position of the missing peak. A relationship between the DAC points (the DAC circuit 404 value) driving the TFPF 402 and the wavelength position is thus established. Then the optical switch 452 is directed to the optical signal input arm 448 and the optical switch 604 is directed to the CD arm. The TFPF 402, which is now working in a stepping mode, is set to the first wavelength position $\lambda_1$ for the CD measurement. The relative arrival timing of this pulse of wavelength $\lambda_1$ is detected and recorded by the time-resolved detection arm 614 (i.e., the CD daughter board 614). Then, another calibration-and-measurement cycle begins. The optical switch 452 is directed to the wavelength calibration arm 408 and a calibration is performed again. The TFPF 402 is tuned to the second wavelength position $\lambda_2$ for the CD measurement. The relative arrival timing of this pulse of wavelength $\lambda_2$ is detected and recorded by the time-resolved detection arm 614. So on so forth until the relative arrival timing of the last wavelength pulse is measured.

Figure 10:
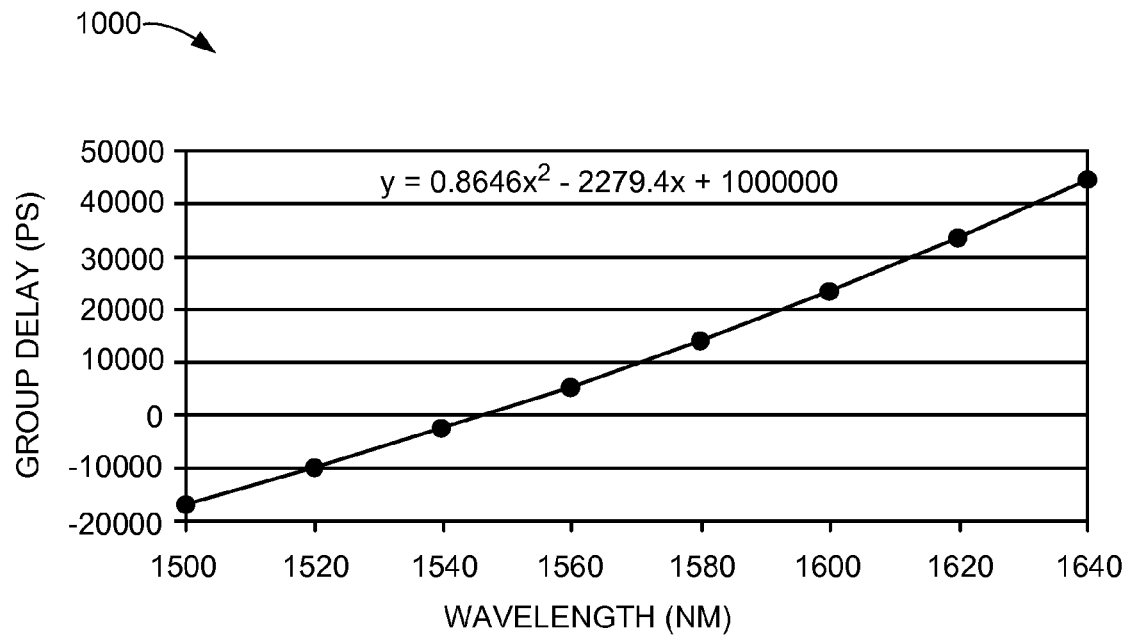
FIG. 10 is a graph depicting measured relative group delay versus wavelength.

Referring now to FIG. 10, therein is shown an example 1000 of measured relative group delay versus wavelength. In a lot of cases, the group delay versus wavelength can be described by a second order polynomial.

Figure 11:
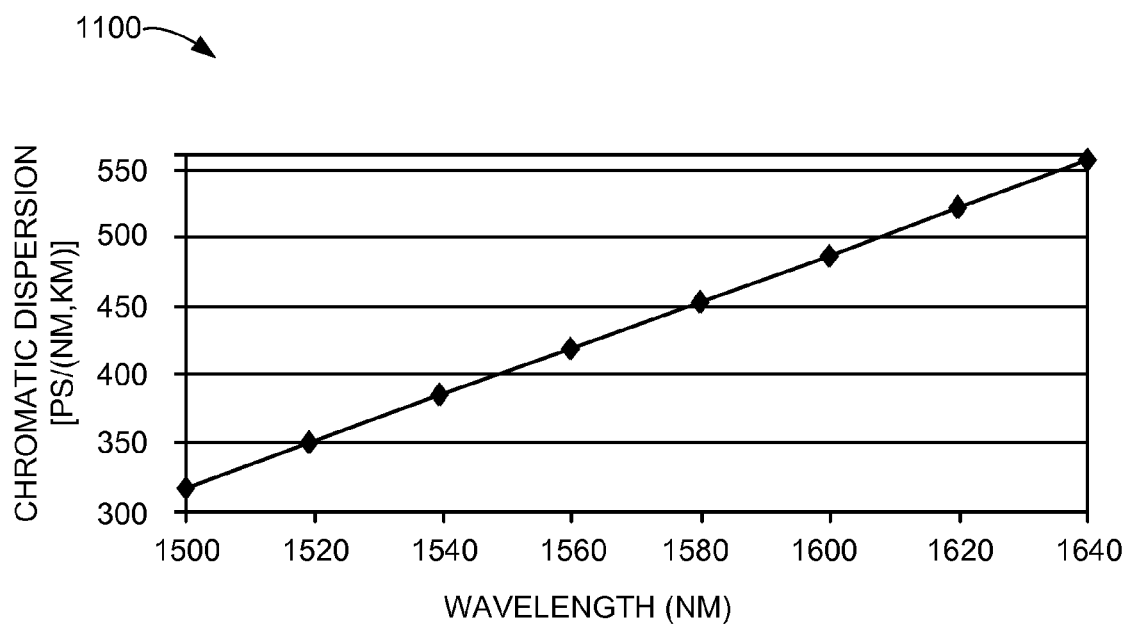
FIG. 11 is a graph depicting chromatic dispersion versus wavelength.

Referring now to FIG. 11, therein is shown an example 1100 of chromatic dispersion versus wavelength. The chromatic dispersion is calculated as the derivative of the group delay on wavelength.

In one embodiment, the CD detector 610 (FIG. 6) contains an avalanche photo detector ("APD") configured for photon counting down to the level of individual photons. For CD measurements, it is then possible with the present invention to do single photon counting. Such single photon counting capability is a substantial advantage inasmuch as some optical signals can be very weak following the several filtering stages that precede the CD detector 610 (cf. Huttner and Brendel, above).

In overall operation, the optical signal measurement system 600 is first calibrated as needed. In some circumstances, the calibration will be a periodic calibration in a laboratory environment (or similar venue) where appropriate, known, and ordinarily broadband tunable calibration laser sources are available. Such a calibration may be performed, for example with an optical calibration signal 624 from a calibration reference 626. The calibration reference 626 may be, for example, a pre-calibrated tunable laser.

In one embodiment, the calibration of the optical signal measurement system 600 is performed by sending a light source with a known wavelength through the TFPF 402 (e.g., via the optical switch 452) and correlating the DAC circuit 404 value that causes the TFPF 402 to detect signals at that wavelength. The process can then be repeated for as many wavelengths as desired or are available to establish the relationships between the DAC circuit 404 values, the corresponding TFPF 402 positions, and the corresponding wavelengths. This calibration procedure creates one-to-one calibration correlations between the DAC circuit 404 values and the corresponding wavelength values for each of the several optical orders of the TFPF 402 in the optical signal measurement system 600 that are being detected. It has been discovered that these correlations, which calibrate and directly relate the separate multiple optical orders of the wavelengths scanned by the TFPF 402, are stable and can be utilized reliably over long periods of time and under varying use and field conditions (e.g., varying temperatures, power supply voltages, etc.).

For field applications, a single, current ("in-field") calibration adjustment measurement may be sufficient. Such a single calibration adjustment measurement may simply determine an offset for the current operational conditions. The offset can then be applied to a full prior (e.g., laboratory or bench-top) calibration that can then be used, with the current in-field calibration offset, across the full band spectrum range. The previous (bench-top) calibration may be stored, for example, in the controller/analyzer 406.

In another embodiment, the calibration correlations may similarly be initially captured at an earlier time (e.g., as part of a laboratory or bench-top calibration procedure) in a cross-reference table that is stored, for example, in the controller/analyzer 406. Then, by later referencing this cross-reference table, it is possible to determine, for any given DAC value, what the detected wavelength will be, for example, in the first detection channel 442, what the detected wavelength will be in the second detection channel 444, and what the detected wavelength will be in the third detection channel 446. In one embodiment, this correlation cross-reference table is called a "calibration-mapping table".

Another calibration procedure may be used to create an adjustment for the calibration-mapping table for the particular operational and environmental conditions that may currently be found at hand. In a field situation, for example, temperature differences, voltage differences, humidity differences, etc., that are different from those present during the original calibration, may need to be accommodated. It is noteworthy that the relative wavelength values in the calibration-mapping table remain stable with respect to each other and retain their one-to-one correlations under such field conditions.

Field conditions may create DAC offsets, however, such that the DAC values then correspond to different sets of corresponding wavelengths. Accordingly, a field calibration may be performed just before the wavelength reference system is to be used. The field calibration can be performed with a locally available external calibration reference source connected to an optical signal input line 628, or with an internally available reference source such as the wavelength reference arm 408.

Thus, using an available field calibration reference source, such as the wavelength reference arm 408, the current, real-time relationships between the DAC points and the available source reference wavelengths are then established and, in one embodiment, saved into a second table that is stored, for example, in the controller/analyzer 406. The values in the second table establish the correlations and cross-references between the original calibration-mapping table and the current actual field DAC and related field wavelength values of the wavelength reference system. In one embodiment, this second, correlation cross-reference table is called a "dynamic mapping table".

An additional (third) table may also prove useful. In one embodiment, for example, adjustments or offsets for the DAC values may then be calculated and generated for every wavelength in the detection channel (e.g., the first, second, or third detection channel 442, 444, or 446) into which the field calibration light source reference wavelengths fall, and stored, for example, in the controller/analyzer 406. In one embodiment, this third table of offsets is called a "dynamic offset table".

To perform a scan on an unknown wavelength presented to the optical signal input line 628, the DAC value obtained for the detected (unknown) wavelength is then adjusted (compensated) according to the values in the dynamic offset table, yielding highly accurate measurements of the wavelengths being scanned.

More particularly, one or more unknown optical signals are input into the optical signal measurement system 600 through the optical signal input line 628. These unknown signals are then scanned through the TFPF 402, and corresponding DAC circuit 404 readings are obtained as the wavelength signals are individually selected by the TFPF 402 and detected by the detector chosen by the second optical switch 604. After deducting the corresponding drifting points, as described by the dynamic offset table, the exact wavelength position corresponding to each measured DAC circuit 404 value is deduced through the calibration-mapping table, thereby specifying the exact wavelengths in the unknown signals. The corresponding wavelength values of the unknown optical signal, scanned through the TFPF 402, are then measured and specified, such as by storage in the controller/analyzer 406, or as data transmitted through the output 454.

In one embodiment, the principle work of scanning an unknown optical signal through the tunable optical filter can thus be performed in various portions of the apparatus of the optical signal measurement system 600. These portions include the TFPF 402 under the control of the DAC circuit 404 and the control of the circuitry in the controller/analyzer 406, and also include the first, second, and third detection channels 442, 444, and 446, as appropriate to the measurements that are to be performed. Similarly, the principle work of measuring the wavelength values of the unknown optical signal scanned through the tunable optical filter can be performed by the various components of the apparatus of the optical signal measurement system 600, including the detectors 606, 608, and 610, as appropriate to the measurements that are to be performed. Likewise, the principle work of specifying the wavelength values in the unknown optical signal can be performed in and/or under the control of the circuitry in the controller/analyzer 406.

Figure 12:
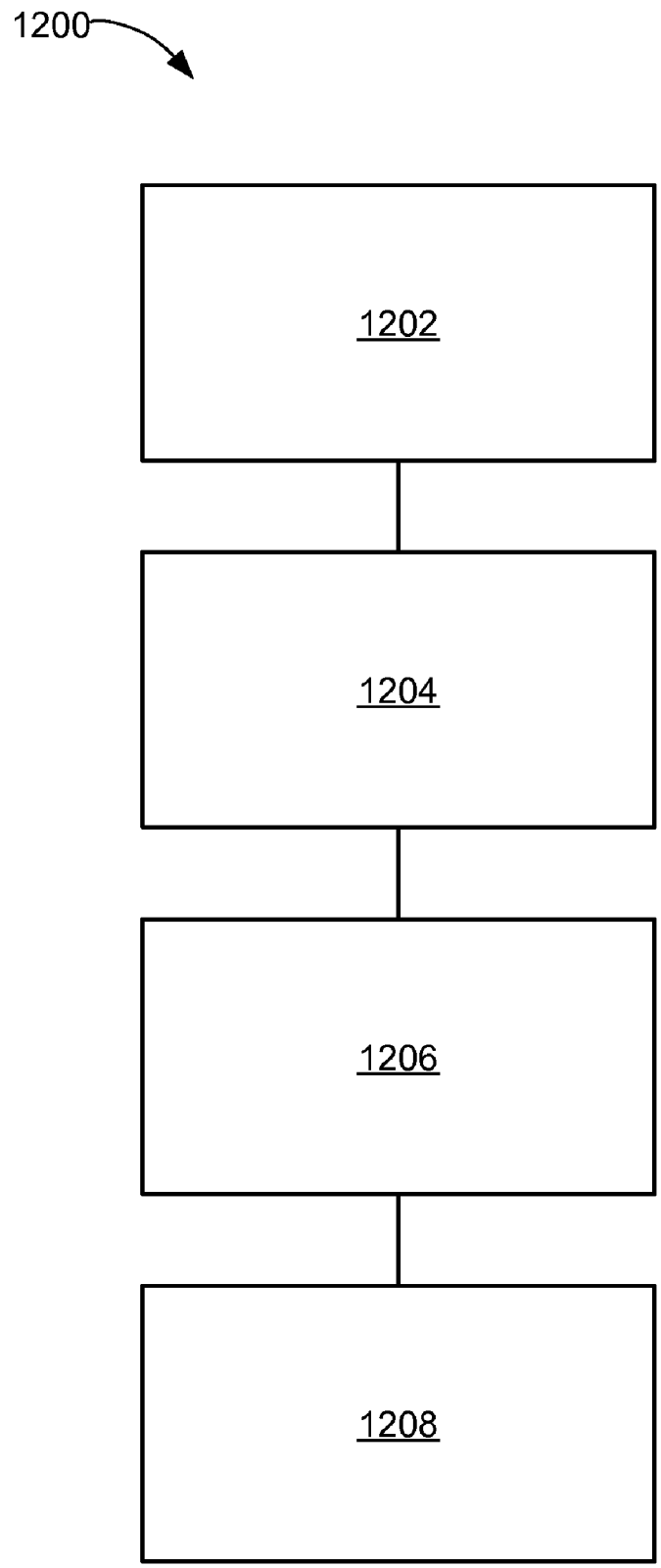
FIG. 12 is a flow chart of an optical signal measurement system in accordance with an embodiment of the present invention.

Referring now to FIG. 12, therein is shown a flow chart of an optical signal measurement system 1200 in accordance with an embodiment of the present invention. The system 1200 includes providing a tunable optical filter in a block 1202; scanning an unknown optical signal through the tunable optical filter in a block 1204; measuring the wavelength and chromatic dispersion values of the unknown optical signal scanned through the tunable optical filter by operating the tunable optical filter in a scanning mode for at least one of OSA and PMD measurements, and in a stepping mode for CD measurements, in a block 1206; and specifying the wavelength and the dispersion values in the unknown optical signal in a block 1208.

It has been discovered that the present invention thus has numerous aspects for the measurement of optical signal properties.

One aspect is that the present invention thus substantially advances the state of the art for optical spectrum analysis, polarization mode dispersion, and chromatic dispersion devices, methods, and related systems utilizing tunable FP interferometers.

A principle aspect of the present invention is the provision of highly effective and efficient OSA-CD-PMD optical signal measurement systems that benefit from and utilize the particular aspects and capabilities of FP interferometers.

Another important aspect of the present invention is that it provides such systems utilizing and requiring but a single TFPF.

Another aspect is that the present invention furnishes accurate measurement systems that unexpectedly achieve significantly improved accuracy over extended wavelength ranges while enabling the combination into a single system of a FP filter-based OSA, CD, and PMD measurement system.

Still another aspect of the present invention is that it enables the use of but a single TFPF that is easily and stably calibrated for all three OSA, CD, and PMD measurements.

Another important aspect is that the single TFPF in the single optical signal measurement system can be easily operated with high accuracy both in a sweeping mode, for OSA and PMD measurements, and in a stepping mode, for CD measurements.

Yet another aspect is that the efficient combination of all three OSA, CD, and PMD measurements into a single system affords significant savings and efficiencies with respect to component, assembly, and manufacturing costs.

A major aspect of the present invention is thus that it provides optical spectrum analyzer and reference systems that employ a high precision and high accuracy TFPF for multiple measurements of wavelengths of light over broad and extended wavelength ranges.

Yet another important aspect of the present invention is that it valuably supports and services the historical trend of reducing costs, simplifying systems, and increasing performance.

These and other valuable aspects of the present invention consequently further the state of the technology to at least the next level.

Thus, it has been discovered that the optical signal measurement system of the present invention furnishes important and heretofore unknown and unavailable solutions, capabilities, and functional aspects for optical spectrum analysis. The resulting systems are straightforward, cost-effective, uncomplicated, highly versatile and effective, can be implemented by adapting known technologies, and are thus readily suited for efficiently and economically manufacturing and operating high performance optical signal measurement systems.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the scope of the included claims. All matters hithertofore set forth herein or shown in the accompanying drawings are to be interpreted in an illustrative and non-limiting sense.

The invention claimed is:

1. An optical signal measurement method, comprising:
   providing a tunable optical filter;
   scanning an unknown optical signal through the tunable optical filter;
   measuring the wavelength and chromatic dispersion values of the unknown optical signal scanned through the tunable optical filter by operating the tunable optical filter:
      in a scanning mode for at least one of optical spectrum analysis and polarization mode dispersion measurements; and
      in a stepping mode for chromatic dispersion measurements; and
   specifying the wavelength and the chromatic dispersion values in the unknown optical signal.

2. The method of claim 1 wherein providing a tunable optical filter further comprises providing a single Fabry-Perot filter.

3. The method of claim 1 further comprising stabilizing the tunable optical filter at each wavelength of each step of the stepping mode for chromatic dispersion measurements.

4. The method of claim 1 wherein measuring the chromatic dispersion values in a stepping mode for chromatic dispersion measurements further comprises measuring the unknown optical signal with an avalanche photodetector.

5. The method of claim 1 further comprising scanning a range of wavelengths at least from substantially 1260 nm to substantially 1640 nm.

6. The method of claim 1 further comprising performing the chromatic dispersion measurements by measuring the relative group delay and then calculating the chromatic dispersion from the derivative of the relative group delay on wavelength.

7. An optical signal measurement method, comprising:
   providing a single tunable optical filter configured for:
      scanning a wavelength range that is larger than the free spectrum range of the tunable optical filter; and
      individually detecting separate multiple optical orders of the wavelengths scanned and filtered by the tunable optical filter;

scanning an unknown optical signal through the tunable optical filter;

measuring the wavelength and chromatic dispersion values of the unknown optical signal scanned through the tunable optical filter by operating the tunable optical filter:
  in a scanning mode for optical spectrum analysis measurements;
  in a scanning mode for polarization mode dispersion measurements; and
  in a stepping mode for chromatic dispersion measurements; and
specifying the wavelength and the chromatic dispersion values in the unknown optical signal.

8. The method of claim 7 wherein providing a single tunable optical filter configured for scanning a wavelength range that is larger than the free spectrum range of the tunable optical filter further comprises providing a single Fabry-Perot filter configured for scanning a range of wavelengths at least from substantially 1260 nm to substantially 1640 nm.

9. The method of claim 7 further comprising stabilizing the tunable optical filter at each wavelength of each step of the stepping mode for chromatic dispersion measurements by time synchronization with the unknown optical signal.

10. The method of claim 7 wherein measuring the chromatic dispersion values in a stepping mode for chromatic dispersion measurements further comprises measuring the unknown optical signal with an avalanche photodetector following a fiber Bragg grating.

11. The method of claim 7 further comprising performing the polarization mode dispersion measurements by calculating an R-function and then calculating the polarization mode dispersion from the R-function by either extrema counting or Fourier transform.

12. The method of claim 7 further comprising performing the chromatic dispersion measurements by measuring the relative group delay and then calculating the chromatic dispersion from the derivative of the relative group delay on wavelength.

13. An optical signal measurement system, comprising:
  a tunable optical filter;
  apparatus for scanning an unknown optical signal through the tunable optical filter;
  apparatus for measuring the wavelength and chromatic dispersion values of the unknown optical signal scanned through the tunable optical filter by operating the tunable optical filter:
    in a scanning mode for at least one of optical spectrum analysis and polarization mode dispersion measurements; and
    in a stepping mode for chromatic dispersion measurements; and
  circuitry for specifying the wavelength and the chromatic dispersion values in the unknown optical signal.

14. The system of claim 13 wherein the tunable optical filter further comprises a single Fabry-Perot filter.

15. The system of claim 13 further comprising apparatus for stabilizing the tunable optical filter at each wavelength of each step of the stepping mode for chromatic dispersion measurements.

16. The system of claim 13 wherein the apparatus for measuring the chromatic dispersion values in a stepping mode for chromatic dispersion measurements further comprises an avalanche photodetector.

17. The system of claim 13 wherein the tunable optical filter further comprises a tunable optical filter configured for scanning a range of wavelengths at least from substantially 1260 nm to substantially 1640 nm.

18. The system of claim 13 further comprising circuitry for performing the chromatic dispersion measurements by measuring the relative group delay and then calculating the chromatic dispersion from the derivative of the relative group delay on wavelength.

19. The optical signal measurement system of claim 13 wherein:
  the tunable optical filter further comprises a single tunable optical filter configured for:
    scanning a wavelength range that is larger than the free spectrum range of the tunable optical filter; and
  a light detection apparatus for individually detecting separate multiple optical orders of the wavelengths scanned and filtered by the tunable optical filter; and
  the apparatus for measuring the wavelength and chromatic dispersion values of the unknown optical signal further comprises apparatus for operating the tunable optical filter:
    in a scanning mode for optical spectrum analysis measurements;
    in a scanning mode for polarization mode dispersion measurements; and
    in a stepping mode for chromatic dispersion measurements.

20. The system of claim 19 wherein the single tunable optical filter further comprises a single Fabry-Perot filter configured for scanning a range of wavelengths at least from substantially 1260 nm to substantially 1640 nm.

21. The system of claim 19 wherein the apparatus for measuring the chromatic dispersion values in a stepping mode further comprises circuitry for stabilizing the tunable optical filter at each wavelength of each step of the stepping mode for chromatic dispersion measurements by time synchronization with the unknown optical signal.

22. The system of claim 19 wherein the apparatus for operating the tunable optical filter in a stepping mode for chromatic dispersion measurements further comprises:
  a fiber Bragg grating configured for receiving the unknown optical signal; and
  an avalanche photodetector following the fiber Bragg grating for measuring the unknown optical signal.

23. The system of claim 19 further comprising circuitry for performing the polarization mode dispersion measurements by calculating the R-function and then calculating the polarization mode dispersion from the R-function by either extrema counting or Fourier transform.

24. The system of claim 19 further comprising circuitry for performing the chromatic dispersion measurements by measuring the relative group delay and then calculating the chromatic dispersion from the derivative of the relative group delay on wavelength.

* * * * *